US011874538B2

(12) United States Patent
Lin et al.

(10) Patent No.: US 11,874,538 B2
(45) Date of Patent: Jan. 16, 2024

(54) APPARATUS AND METHOD FOR GENERATING AN OPTICAL SIGNAL

(71) Applicant: TAIWAN SEMICONDUCTOR MANUFACTURING COMPANY LIMITED, Hsin-Chu (TW)

(72) Inventors: Chih-Chang Lin, San Jose, CA (US); Chan-Hong Chern, Palo Alto, CA (US)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 429 days.

(21) Appl. No.: 17/038,526

(22) Filed: Sep. 30, 2020

(65) Prior Publication Data

US 2022/0100007 A1 Mar. 31, 2022

(51) Int. Cl.
*G02F 1/01* (2006.01)

(52) U.S. Cl.
CPC ............ *G02F 1/011* (2013.01); *G02F 1/0121* (2013.01)

(58) Field of Classification Search
CPC ............................... G02F 1/011; G02F 1/0121
See application file for complete search history.

(56) References Cited

U.S. PATENT DOCUMENTS

| | | | |
|---|---|---|---|
| 7,280,267 B2 | 10/2007 | Van Tuyl | |
| 8,295,655 B2* | 10/2012 | Manipatruni | G02B 6/4215 385/9 |
| 8,488,917 B2* | 7/2013 | Manipatruni | G02F 1/2257 385/2 |
| 9,348,154 B2* | 5/2016 | Hayakawa | G02F 1/225 |
| 9,645,469 B2* | 5/2017 | Lemaitre | G02F 1/2257 |
| 9,651,803 B2* | 5/2017 | Abiri | G02F 1/025 |
| 10,027,089 B2* | 7/2018 | Liang | H01S 5/142 |
| 10,295,847 B1* | 5/2019 | Tytgat | G02F 1/2257 |
| 10,901,153 B2* | 1/2021 | Ma | G02B 6/12007 |
| 2010/0098372 A1* | 4/2010 | Manipatruni | G02B 6/4215 385/2 |
| 2010/0158426 A1* | 6/2010 | Manipatruni | G02F 1/2257 385/2 |

(Continued)

FOREIGN PATENT DOCUMENTS

| | | | | |
|---|---|---|---|---|
| CN | 105190385 A | | 12/2015 | |
| CN | 205563006 U | * | 9/2016 | ............. G02F 1/025 |

(Continued)

OTHER PUBLICATIONS

Rui Li, David Patel, Eslam El-Fiky, Alireza Samani, Zhenping Xing, Mohamed Morsy-Osman, and David V. Plant, "High-speed low-chirp PAM-4 transmission based on push-pull silicon photonic microring modulators," Opt. Express 25, 13222-13229 (2017) (Year: 2017).*

Primary Examiner — Peter Radkowski
(74) Attorney, Agent, or Firm — COOPER LEGAL GROUP, LLC (57) ABSTRACT

A directional coupler is configured to receive a continuous light waveform and split the waveform into two carrier signals. Ring modulators are configured to receive the carrier signals and binary data and modulate the carrier signals based on the binary data. A combiner is configured to combine the modulated carrier signals into a four-level pulse amplitude modulation (PAM4) signal.

19 Claims, 7 Drawing Sheets

(56) References Cited

U.S. PATENT DOCUMENTS

| | | | | |
|---|---|---|---|---|
| 2015/0132015 | A1* | 5/2015 | Hayakawa | G02B 6/28 |
| | | | | 385/2 |
| 2015/0380900 | A1* | 12/2015 | Liang | H04B 10/801 |
| | | | | 385/2 |
| 2016/0226581 | A1* | 8/2016 | Jiang | H04B 10/801 |
| 2017/0023809 | A1* | 1/2017 | Abiri | G02F 1/0121 |
| 2017/0059893 | A1* | 3/2017 | Lemaitre | G02F 1/225 |
| 2017/0131613 | A1 | 5/2017 | Saeedi et al. | |
| 2019/0155064 | A1* | 5/2019 | Tytgat | G02F 1/2257 |
| 2020/0200975 | A1* | 6/2020 | Ma | G02F 1/225 |

FOREIGN PATENT DOCUMENTS

| | | | | | |
|---|---|---|---|---|---|
| CN | 106483686 | A | | 3/2017 | |
| CN | 206759461 | U | * | 12/2017 | ......... H04B 10/5165 |
| CN | 108631877 | A | | 10/2018 | |
| CN | 111240053 | A | * | 6/2020 | ............. G02F 1/011 |
| CN | 111240053 | A | | 6/2020 | |
| CN | 108631877 | B | * | 9/2023 | ......... H04B 10/5165 |
| TW | 384404 | B | | 3/2000 | |
| TW | I237711 | B | | 8/2005 | |
| TW | 201316060 | A | | 4/2013 | |

* cited by examiner

FIG. 6A  Cross-Sectional View Along X-X of Fig. 5

FIG. 6B  Cross-Sectional View Along Y-Y of Fig. 5

APPARATUS AND METHOD FOR GENERATING AN OPTICAL SIGNAL

BACKGROUND

Integrated circuits are implemented in a multitude of electronic systems, such as mobile phones, laptops, desktops, tablets, watches, gaming systems, and other industrial, commercial, and consumer electronics. In most electronic systems, data is communicated between or within integrated circuits. The rate of data communication directly affects the performance of electronic systems.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

In some embodiments, an optical signal modulator splits an optical waveform into two carrier signals. A first carrier signal of the carrier signals is modulated in accordance with a value of a first bit of a two-bit signal to generate a first modulated carrier signal, and a second carrier signal of the carrier signals is modulated in accordance with a value of a second bit of the two-bit signal to generate a second modulated carrier signal. Modulation of the carrier signals continues as such based on a series of two-bit signals. The two modulated carrier signals are combined, such as by adding the power levels (e.g., intensities) of the two modulated carrier signals.

In some embodiments, the optical signal modulator has a symmetrical directional coupler that splits the optical waveform into the two carrier signals. Because the directional coupler is symmetrical, the two carrier signals are consequently 90° out of phase. The 90° difference in phase results in the light fields of the two carrier signals being orthogonal, thereby resulting in the power levels (e.g., intensities) of the two carrier signals being equal to the power level of the optical waveform. In some embodiments, the directional coupler also splits the power of the optical waveform such that one of the carrier signals has a power level that is different than the power level of the other carrier signal. The carrier signals are combined after modulation to form a 4-level signal, referred to as a four-level pulse amplitude modulation (PAM4) signal.

The optical signal modulator is compact compared to conventional PAM4 signal generators. In some embodiments, the data rate of the optical signal modulator is double the baud rate of the two carrier signals. For example, if the baud rate of each carrier signal is 50 Gigabits/second, the data rate of the optical signal modulator is 100 Gigabits/second.

Figure 1:
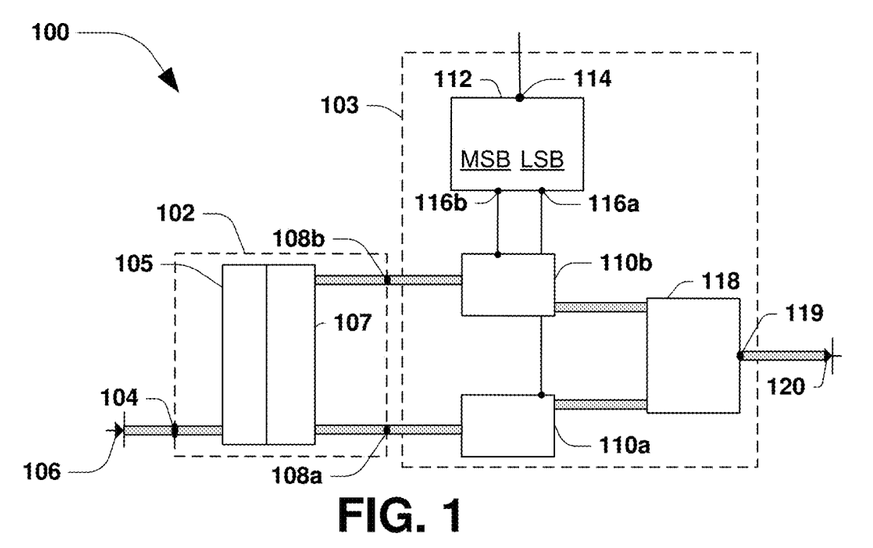
FIGS. 1-4 are illustrations of an optical signal modulator, according to some embodiments.

Turning to FIG. 1, in accordance with some embodiments, at least some of an optical signal modulator 100 comprises components, including silicon-based components, formed over a silica insulator. In some embodiments, the silicon-based components comprise a carrier signal generator 102 optically coupled to a carrier signal modulator 103. The carrier signal generator 102 comprises an input terminal 104 for receiving a light signal from a light source 106. In some embodiments, the light signal is a continuous wave (CW) light signal, such as CW laser emitted from a CW laser device functioning as the light source 106. The carrier signal generator 102 comprises a first output terminal 108a and a second output terminal 108b. According to some embodiments, the carrier signal generator 102 is configured to receive the light signal at the input terminal 104, split the light signal into a first carrier signal and a second carrier signal, phase shift at least one of the first carrier signal or the second carrier signal, and output the first carrier signal at the first output terminal 108a and the second carrier signal at the second output terminal 108b. Other configurations of the carrier signal generator 102 are within the scope of the present disclosure.

The carrier signal generator 102 comprises one or more of a light splitter 105 or a phase shifter 107, where the light splitter 105 is configured to split the light signal into the first carrier signal and the second carrier signal, and the phase shifter 107 is configured to phase shift at least one of the first carrier signal or the second carrier signal.

According to some embodiments, the light splitter 105 is configured to split the power level of the light signal into the first carrier signal and the second carrier signal at a power ratio of α:1-α. In some embodiments, α=⅔ such that the power level of the first carrier signal is ⅔ the power level of the light signal and the power level of the second carrier signal is ⅓ the power level of the light signal. When α=⅔, the power level of the first carrier signal is two-times the power level of the second carrier signal. Other configurations and power ratios of the light splitter 105 are within the scope of the present disclosure.

The phase shifter 107 is configured to phase shift at least one of the first carrier signal or the second carrier signal such that the first carrier signal and the second carrier signal are out of phase. According to some embodiments, a phase difference between the first carrier signal and the second carrier signal when the first carrier signal and the second carrier signal are output at the first output terminal 108a and the second output terminal 108b, respectively, is 90°. In a configuration of the phase shifter 107, the first carrier signal is shifted +45° and the second carrier signal is shifted −45°. In another configuration of the phase shifter 107, the first carrier signal is not shifted, and the second carrier signal is shifted either +90° or −90°. Other configurations and shifting ratios of the phase shifter 107 are within the scope of the present disclosure.

Figure 2:
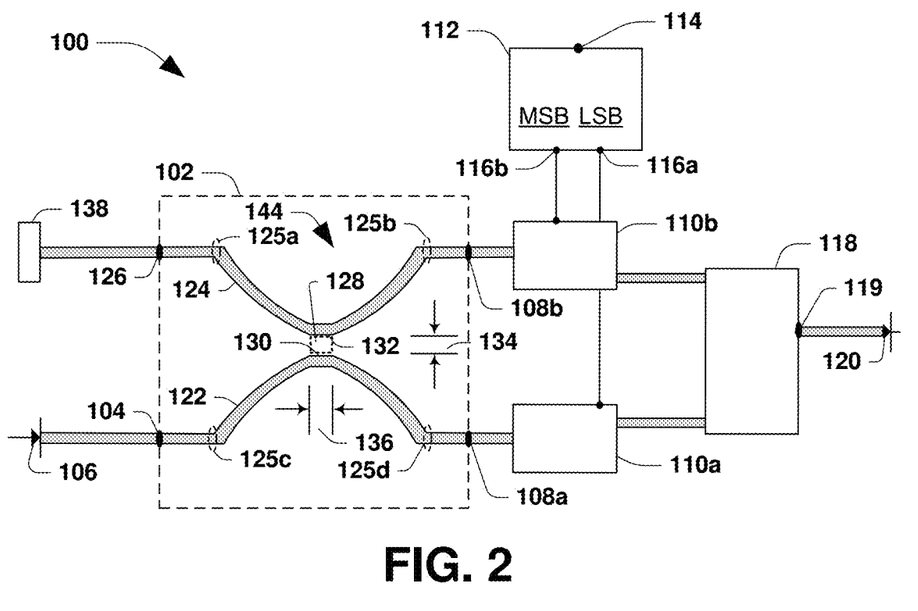

As will be further described with respect to FIG. 2, in some embodiments, the splitting of the light signal and the phase shifting of the at least one of the first carrier signal or the second carrier signal may be performed concurrently by a single, physical component. Thus, the light splitter 105 and the phase shifter 107 may be one component. In other embodiments, the splitting of the light signal and the phase shifting of at least one of the first carrier signal or the second carrier signal may be performed serially and may be performed by separate physical components of the carrier signal generator.

The carrier signal modulator 103 comprises a first modulator 110a optically coupled to the first output terminal 108a of the carrier signal generator 102 and a second modulator 110b optically coupled to the second output terminal 108b. The first modulator 110a and the second modulator 110b are configured to receive the first carrier signal and the second carrier signal, respectively, after the at least one of the first carrier signal and the second carrier signal is phase shifted by the phase shifter 107. The first modulator 110a modulates the first carrier signal based on a first signal received from a signal generator 112, and the second modulator 110b modulates the second carrier signal based on a second signal received from the signal generator 112.

According to some embodiments, the signal generator 112 comprises a data input terminal 114 configured to receive a multi-bit signal that comprises a least significant bit (LSB) and a most significant bit (MSB). The LSB, or a signal having a voltage level that corresponds to the LSB, is communicated from a first output terminal 116a of the signal generator 112 to the first modulator 110a to drive modulation of the first carrier signal. The first modulator 110a modulates a portion of the first carrier signal based on a current LSB to generate a first modulated carrier signal. The MSB, or a signal having a voltage level that corresponds to the MSB, is communicated from a second output terminal 116b of the signal generator 112 to the second modulator 110b to drive modulation of the second carrier signal. The second modulator 110b modulates a portion of the second carrier signal based on a current MSB to generate a second modulated carrier signal. Other configurations of at least one of the signal generator 112, the first modulator 110a, or the second modulator 110b are within the scope of the present disclosure.

The carrier signal modulator 103 comprises an optical signal combiner 118 configured to combine the first modulated carrier signal with the second modulated carrier signal to generate a combined modulated signal. According to some embodiments, the optical signal combiner 118 is an optical adder configured to add the second modulated carrier signal to the first modulated carrier signal to generate the combined modulated signal. For example, the optical signal combiner 118 may be a multi-mode interferometer (MMI). A power level of the combined modulated signal corresponds to the multi-bit signal received by the signal generator 112 at the data input terminal 114.

In some embodiments, when the MSB equals 0 the power level of the second modulated carrier signal is at a first level, such as 0 volt (V). When the LSB equals 0, the power level of the first modulated carrier signal is at a second level, such as 0 V. When the MSB=1, the power level of the second modulated carrier signal is "x V", where x is a rational number not equal to zero. When the LSB=1, the power level of the first modulated carrier signal is "2x V". Thus, the signal level of the combined modulated signal generated by the optical signal combiner 118 is one of four possible signal levels that corresponds to the MSB/LSB combination as shown in table 1.

TABLE 1

| MSB | LSB | SIGNAL LEVEL OF COMBINED MODULATED SIGNAL |
|---|---|---|
| 0 | 0 | 0 V + 0 V = 0 V |
| 0 | 1 | 0 V + 2x V = 2x V |
| 1 | 0 | 1x V + 0 V = 1x V |
| 1 | 1 | 1x V + 2x V = 3x V |

Because there are four possible signal levels of the combined modulated signal, the optical signal modulator 100 is a four-level pulse amplitude modulation (PAM4) modulator that generates a PAM4 signal based on the multi-bit signal received by the signal generator 112 at the data input terminal 114. The carrier signal modulator 103 is configured to communicate the PAM4 signal to an output terminal 119. The PAM4 signal is communicated to an optic-to-electric signal converter 120. Other configurations of the carrier signal modulator 103 are within the scope of the present disclosure.

Referring to FIG. 2, in accordance with some embodiments, the carrier signal generator 102 comprises a directional coupler 144 comprising a first waveguide 122 and a second waveguide 124. The first waveguide 122 is formed as a semi-circle having a first optical coupling surface 130 comprising a linear portion located at a mid-point region of the first waveguide 122. The second waveguide 124 is also formed as a semi-circle having a second optical coupling surface 132 comprising a linear portion located at a mid-point region of the second waveguide 124. The second waveguide 124 is optically coupled to the first waveguide 122 by way of an optical coupling region 128. The optical coupling region 128 may comprise a light permeable material, such as glass or other material suitable for transmission of signals in a wavelength range of the light signal, may comprise air, or may be void of material. The optical coupling region 128 has an optical coupling length 136 and an optical coupling width 134. The optical coupling length 136 is defined by lengths of the linear portions of the first waveguide 122 and the second waveguide 124. The optical coupling width 134 is defined as a distance between the first optical coupling surface 130 and the second optical coupling surface 132.

The directional coupler 144 comprises a first port 125a, a second port 125b, a third port 125c, and a fourth port 125d. The third port 125c is optically coupled to the input terminal 104 and receives the light signal from the light source 106. The fourth port 125d is optically coupled to the first output terminal 108a of the carrier signal generator. A first portion of the light signal, referred to as the first carrier signal, is transmitted through the first waveguide 122 to the first output terminal 108a and to the first modulator 110a. Because the first waveguide 122 and the second waveguide 124 are optically coupled, a second portion of the light signal, referred to as the second carrier signal, is transmitted through the optical coupling region 128 to the second waveguide 124, to the second port 125b, and to the second modulator 110b. While the first port 125a may receive some of the light signal transmitted to the second waveguide 124, the amount received by the first port 125a may be negligible, such as $1/1000^{th}$ of the light signal. In some embodiments, an output terminal 126 of the carrier signal generator 102 is optically coupled to the first port 125a and to an absorption terminator 138. The absorption terminator 138 absorbs light received by the output terminal 126. Other configurations of the directional coupler 144 are within the scope of the present disclosure.

Due to the symmetrical configuration of the directional coupler 144 and the optical coupling region 128, there is a 90° phase difference between the second portion of the light signal transmitted to the second port 125b and the first portion of the light signal transmitted to the fourth port 125d.

The power ratio of the power of the first carrier signal to the power of the second carrier signal is based on the dimensions of the optical coupling region 128 and is adjustable by adjusting at least one of the optical coupling length 136 or the optical coupling width 134. The power ratio of the first carrier signal to the second carrier signal is increased by at least one of increasing the optical coupling length 136 or decreasing the optical coupling width 134. The power ratio of the first carrier signal to the second carrier signal is decreased by at least one of decreasing the optical coupling length 136 or increasing the optical coupling width 134. According to some embodiments, a specified power ratio of the first carrier signal to the second carrier signal is obtained by at least one of iteratively adjusting at least one of the optical coupling length 136 or the optical coupling width 134 until the power ratio converges on the specified power ratio. In some embodiments, the power ratio of the first carrier signal to the second carrier signal is 2:1.

Figure 3:
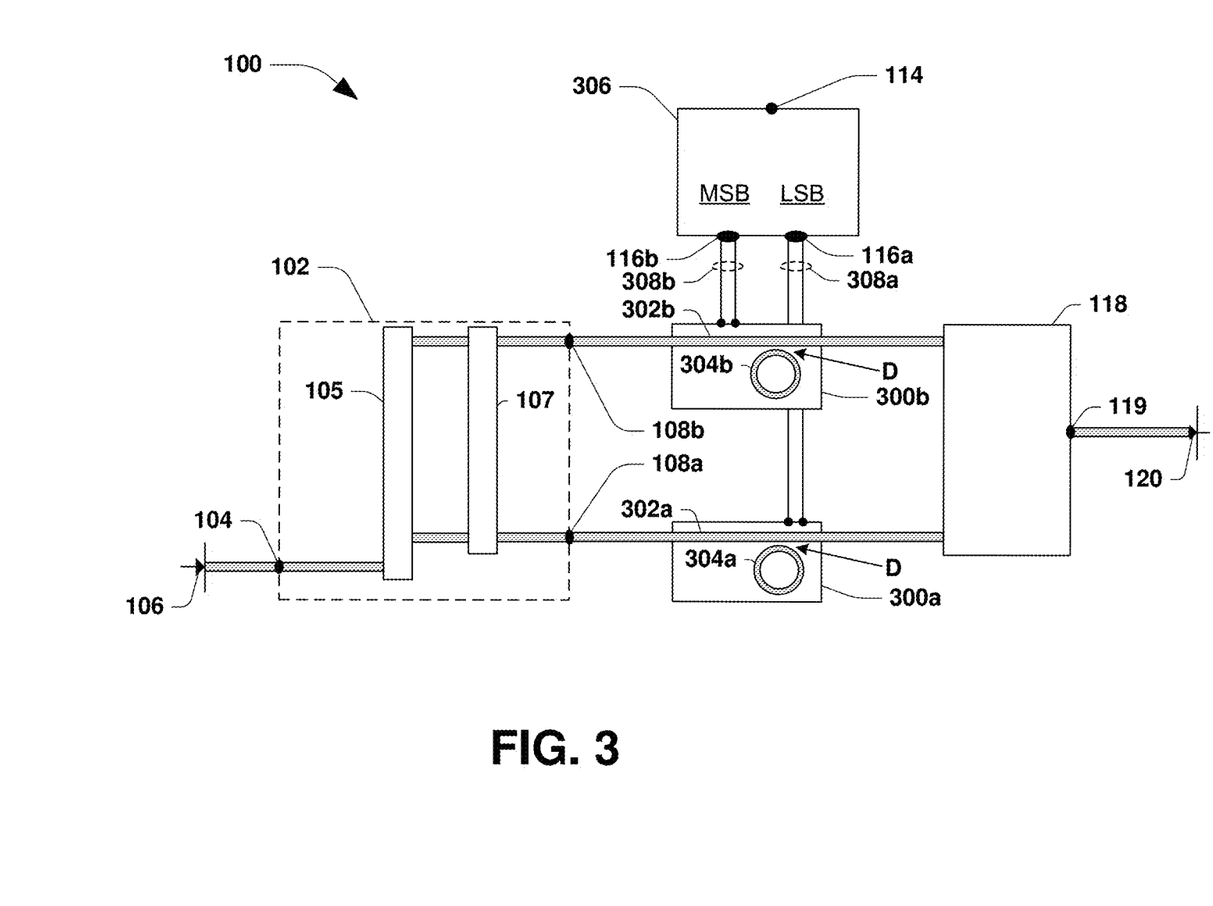

Referring to FIG. 3, in accordance with some embodiments, the first modulator 110a is a first ring modulator 300a and the second modulator 110b is a second ring modulator 300b. The first ring modulator 300a comprises a first waveguide bus 302a optically coupled to the first output terminal 108a of the carrier signal generator 102 and to the optical signal combiner 118. The first ring modulator 300a comprises a first waveguide ring 304a adjacent to the first waveguide bus 302a. In some embodiments, a circumference of the first waveguide ring 304a is a positive integer multiple of a wavelength of the first carrier signal. The first waveguide bus 302a is configured to carry the first carrier signal.

The second ring modulator 300b comprises a second waveguide bus 302b optically coupled to the second output terminal 108b of the carrier signal generator 102 and to the optical signal combiner 118. The second ring modulator 300b comprises a second waveguide ring 304b adjacent to the second waveguide bus 302b. In some embodiments, a circumference of the second waveguide ring 304b is a positive integer multiple of a wavelength of the second carrier signal, which may be the same wavelength at the first carrier signal. The second waveguide bus 302b is configured to carry the second carrier signal.

It is to be understood that descriptions below of features of the first ring modulator 300a also apply to the second ring modulator 300b. Therefore, some features of the second ring modulator 300b are not discussed herein to avoid repetition of disclosure.

A number no greater than slight distance "D" between the first waveguide ring 304a and the first waveguide bus 302a, or between the second waveguide ring 304b and the second waveguide bus 302b facilitates light absorption by the first waveguide ring 304a from the first waveguide bus 302a or by the second waveguide ring 304b from the second waveguide bus 302b. According to some embodiments, the slight distance "D" between the first waveguide ring 304a and the first waveguide bus 302a is dependent on the wavelength of the first carrier signal and an amount of the first carrier signal lost during one turn (rotation) inside the first waveguide ring 304a. According to some embodiments, the slight distance "D" between the second waveguide ring 304b and the second waveguide bus 302b is dependent on the wavelength of the second carrier signal and an amount of the second carrier signal lost during one turn inside the second waveguide ring 304b. In some embodiments, a coupling coefficient of the first ring modulator 300a depends upon the slight distance "D" between the first waveguide ring 304a and the first waveguide bus 302a, and a coupling coefficient of the second ring modulator 300b depends upon the slight distance "D" between the second waveguide ring 304b and the second waveguide bus 302b. A coupling coefficient of a ring modulator 300a, 300b depends on the slight distance "D" between the waveguide ring 304a, 304b and the waveguide bus 302a, 302b thereof. For example, if the slight distance "D" is smaller, the coupling coefficient is bigger. Assuming that the amount of the carrier signal lost during one turn inside the waveguide ring 304a, 304b is a first percentage (y) of the power level (e.g., intensity) of the carrier signal, in some embodiments, the slight distance "D" for each ring modulator 300a, 300b is selected such that the coupling coefficient of the ring modulator 300a, 300b is substantially equal to (e.g., equal to within +/−10%) or is equal to the first percentage (y).

In some embodiments, the signal generator 112 is a differential signal generator 306 electrically coupled to the first ring modulator 300a by differential signal first conductors 308a and to the second ring modulator 300b by differential signal second conductors 308b. The differential signal generator 306 comprises the data input terminal 114 configured to receive the multi-bit signal that comprises the LSB and the MSB.

The differential signal generator 306 is configured to generate a first differential signal that corresponds to the LSB and communicate the first differential signal to the first ring modulator 300a to drive modulation of the first carrier signal. The first ring modulator 300a modulates a portion of the first carrier signal based on the first differential signal. In some embodiments, as will be further described with respect to FIGS. 5-7, the first ring modulator 300a is configured to control an amount of light absorbed from the first waveguide bus 302a by the first waveguide ring 304a by modulating a pn-junction of the first waveguide ring 304a. Modulating the pn-junction in turn modulates an electron/hole density of the first waveguide ring 304a. Modulating the electron/hole density of the first waveguide ring 304a modulates a resonance frequency of the first waveguide ring 304a, which in turn modulates an amount of light absorbed from the first waveguide bus 302a through which the first carrier signal traverses. Thus, the first carrier signal is modulated according to the amount of light absorbed by the first waveguide ring 304a, which is a function of the first differential signal.

The differential signal generator 306 is configured to generate a second differential signal that corresponds to the MSB and communicate the second differential signal to the second ring modulator 300b to drive modulation of the second carrier signal in a manner similar to that of the first differential signal as discussed above. Other configurations of the differential signal generator 306, the first ring modulator 300a, or the second ring modulator 300b are within the scope of the present disclosure.

Figure 4:
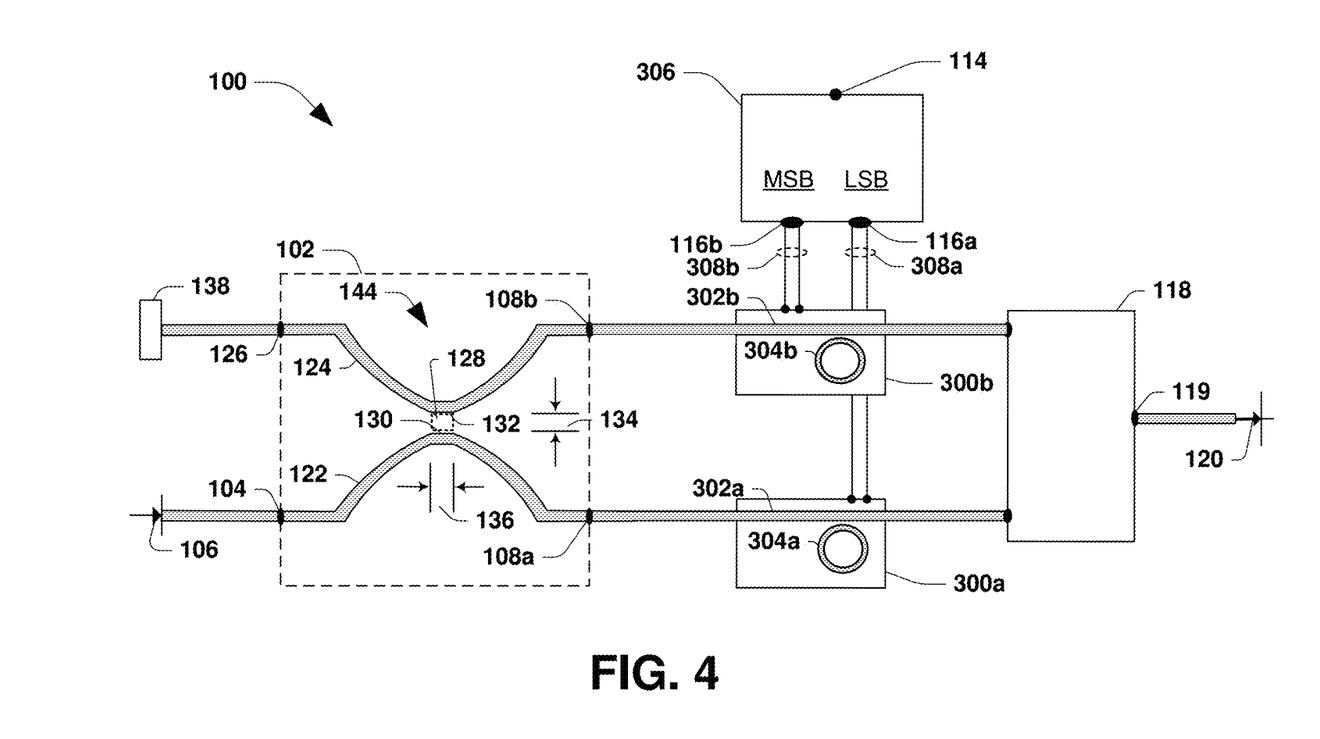

Referring to FIG. 4, according to some embodiments the optical signal modulator 100 comprises the directional coupler 144, the first ring modulator 300a, the second ring modulator 300b, the differential signal generator 306, and the optical signal combiner 118 in accordance with some embodiments. As illustrated, the structure of the optical signal modulator 100 is symmetrical. Because the optical signal modulator 100 is symmetrical, a 90° phase difference between the first carrier signal and second carrier signal is readily obtainable and sustainable. The optical signal modulator 100 maintains the 90° phase difference without the need for external components, such as adjustable heaters, to control the respective phases of the first carrier and the second carrier signal, decibel adjusters to establish and maintain a power ratio of the first carrier signal and the second carrier signal, or other additional internal or external components. Thus, the optical signal modulator 100 is symmetrical and compact.

Figure 5:
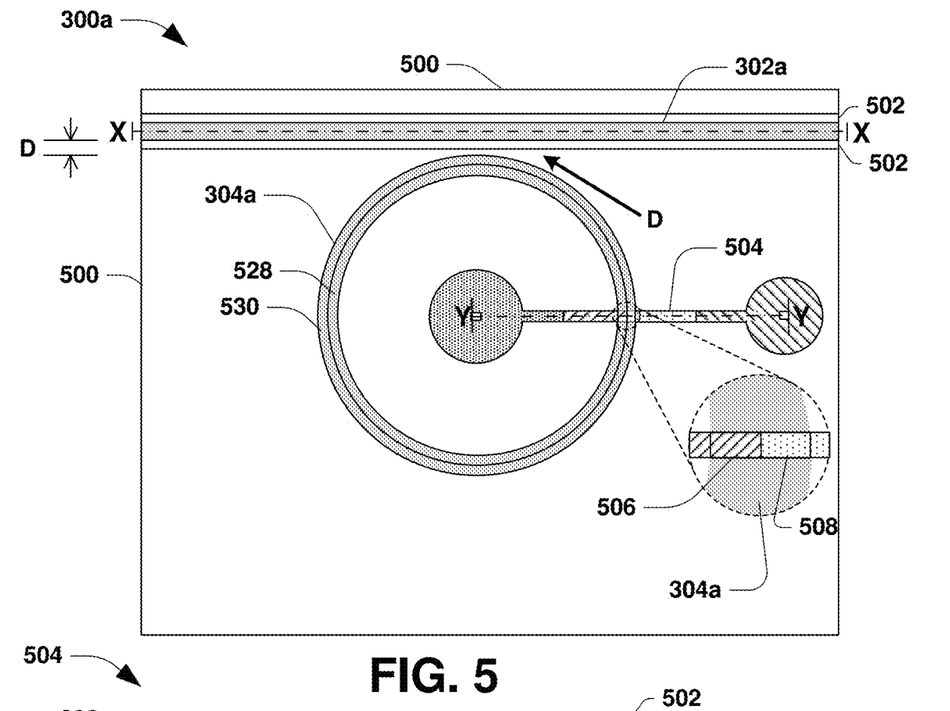
FIG. 5 is an illustration of a ring modulator, according to some embodiments.
Figure 6A:
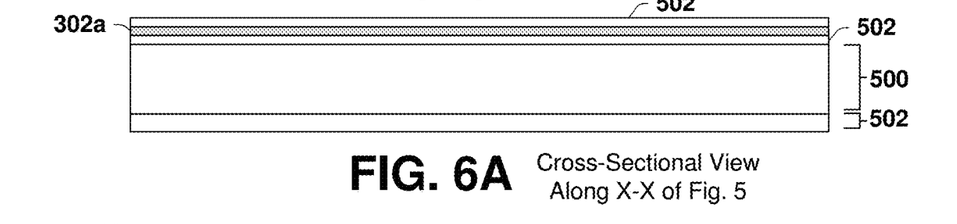
FIG. 6A is a cross-sectional view of a waveguide bus taken along line X-X of FIG. 5, according to some embodiments.
Figure 6B:
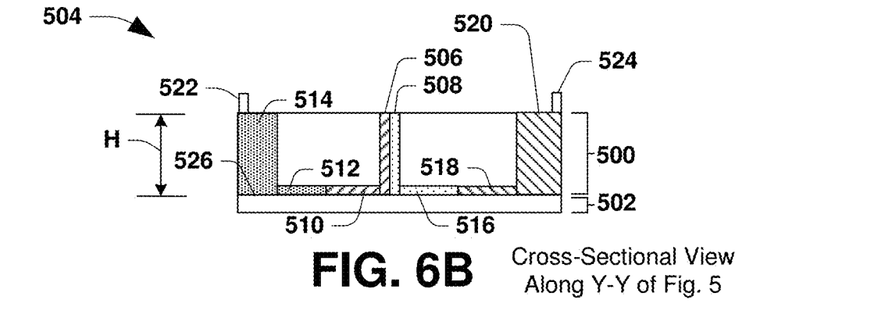
FIG. 6B is a cross-sectional view of semiconductor regions of a ring modulator taken along line Y-Y of FIG. 5.

Referring to FIGS. 5, 6A, and 6B, FIG. 5 is an illustration of the first ring modulator 300a, FIG. 6A is a cross-sectional view of the first waveguide bus 302a taken along line X-X of FIG. 5, and FIG. 6B is a cross-sectional view of semiconductor regions 504 of the first ring modulator 300a taken along line Y-Y of FIG. 5.

According to some embodiments, the first waveguide bus 302a is formed of silicon of a substrate 500. A silica insulator 502 encloses the first waveguide bus 302a and comprises a portion (shown in FIG. 6A; not depicted in FIG. 5) over the first waveguide bus 302a. The first waveguide ring 304a comprises concentric rings, including a first ring 528 adjacent to a second ring 530. In some embodiments, the first ring 528 comprises dopants of a first dopant type and the second ring 530 comprises dopants of a second dopant type. In some embodiments, the first ring 528 is p− doped and the second ring 530 is n− doped. In FIG. 5, the first ring 528 and the second ring 530 are illustrated as equally shaded portions of the first waveguide ring 304a. However, it is to be understood that the first ring 528 comprises dopants of the first dopant type and the second ring 530 comprises dopants of the second dopant type.

A slight gap separates the first waveguide bus 302a from the first waveguide ring 304a by the slight distance "D". The slight distance "D" is such that light from the first waveguide bus 302a when the first carrier signal is transmitted through the first waveguide bus 302a can traverse into the first waveguide ring 304a. According to some embodiments, some of the traversed light is absorbed by the first waveguide ring 304a and some of the traversed light traverses back into the first waveguide bus 302a. As some light is absorbed by the first waveguide ring 304a and some light traverses back into the first waveguide bus 302a, the intensity of the light signal passing through the first waveguide bus 302a changes when the resistance of the first waveguide ring 304a changes. The light signal passing through the first waveguide bus 302a is modulated by controlling how much light is absorbed by the first waveguide ring 304a. As explained below, the amount of light absorbed by the first waveguide ring 304a is controlled by applying a differential voltage between a first contact 522 and a second contact 524.

In some embodiments, the semiconductor regions 504 include a first ring region 506 that is a portion of the first ring 528 and a second ring region 508 that is a portion of the second ring 530. The first ring region 506 comprises dopants of the first dopant type and the second ring region 508 comprises dopants of the second dopant type. In some embodiments, the first ring region 506 is p− doped and the second ring region 508 is n− doped. As illustrated in FIG. 6B, the first ring region 506 and the second ring region 508 each extend a distance "H" from an upper surface 526 of the silica insulator 502. According to some embodiments, the first ring region 506 and the second ring region 508 comprise a P/N junction having a depletion region.

In some embodiments, the semiconductor regions 504 include a first buried region 510 adjacent to the first ring region 506 and a second buried region 516 adjacent to the second ring region 508. The first buried region 510 may comprise dopants of the first dopant type and the second buried region 516 may comprise dopants of the second dopant type. In some embodiments, the first buried region 510 is p− doped and the second buried region 516 is n− doped. The first buried region 510 and the second buried region may extend less than the distance "H" from the upper surface 526 of the silica insulator 502.

In some embodiments, the semiconductor regions 504 include a third buried region 512 adjacent to the first buried region 510, and a fourth buried region 518 adjacent to the second buried region 516. The third buried region 512 may comprise dopants of the first dopant type and the fourth buried region 518 may comprise dopants of the second dopant type. In some embodiments, the third buried region 512 is p+ doped and the fourth buried region 518 is n+ doped. The third buried region 512 and the fourth buried region 518 may extend less than the distance "H" from the upper surface 526 of the silica insulator 502.

In some embodiments, the semiconductor regions 504 include a first contact region 514 adjacent to the third buried region 512 and a second contact region 520 adjacent to the fourth buried region 518. The first contact region 514 may comprise dopants of the first dopant type and the second contact region 520 may comprise dopants of the second dopant type. In some embodiments, the first contact region 514 is p+ doped and the second contact region 520 is n+ doped. In some embodiments, the first contact region 514 and the second contact region 520 extend the distance "H" from the upper surface 526 of the silica insulator 502.

According to some embodiments, the first buried region 510, the third buried region 512, and the first contact region 514 electrically couple the first contact 522 to the first ring region 506, and the second buried region 516, the fourth buried region 518, and the second contact region 520 electrically couple the second contact 524 to the second ring region 508. According to some embodiments, the first ring region 506 and the second ring region 508 comprise a P/N junction having a depletion region. Other configurations of the semiconductor regions 504 are within the scope of the present disclosure.

According to some embodiments, the depletion region is modulated by applying different voltage differentials to the first contact 522 and the second contact 524. The first contact 522 receives a first voltage from the differential signal generator 306 and the second contact 524 receives a second voltage from the differential signal generator 306. The first voltage may be less than the second voltage. Modulating the depletion region modulates the electron/hole density of the first waveguide ring 304a. Modulating the electron/hole density of the first waveguide ring 304a in turn shifts the resonance frequency of the first waveguide ring 304a. According to some embodiments, when the resonance frequency of the first waveguide ring 304a is in harmony with the frequency of the first carrier signal, a greater portion of light from the first waveguide bus 302a is absorbed by the first waveguide ring 304a. The absorbed light is not reflected back into the first waveguide bus 302a. Adjusting the resonance frequency of the first waveguide ring thus modulates the first carrier signal to generate the first modulated signal.

Referring to FIGS. 4 and 6B, each of the differential signal first conductors 308a is electrically coupled to a respective first contact 522 or second contact 524. The differential voltage of the differential signal first conductors 308a corresponds to the LSB. The LSB thus modulates the first carrier signal of the first waveguide bus 302a. According to some embodiments, if the LSB is a zero, a first amount of the first carrier signal is received by the optical signal combiner 118. If the LSB is a one, a second amount of the first carrier signal is received by the optical signal combiner 118. The second amount of light of the first carrier signal is different than the first amount of light of the first carrier signal.

According to some embodiments, the configuration of the second ring modulator 300b is similar to the configuration of the first ring modulator 300a. In the second ring modulator 300b, each of the differential signal second conductors 308b is electrically coupled to a respective first contact 522 or second contact 524 of the second ring modulator 300b. The differential voltage of the differential signals corresponds to the MSB. The MSB thus modulates the second carrier signal of the second waveguide bus 302b similar to how the LSB modulates the first carrier signal of the first waveguide bus 302a. If the MSB is a zero, a first amount of the second carrier signal is received by the optical signal combiner 118. If the MSB is a one, a second amount of the second carrier signal is received by the optical signal combiner 118. The second amount of light of the second carrier signal is different than the first amount of light of the second carrier signal. According to some embodiments, at least one of the first amount of light of the second carrier signal or the second amount of light of the second carrier signal is different than the first amount of light of the first carrier signal and the first amount of light of the first carrier signal.

Because the LSB has two possible values (0 or 1), the first modulated signal can have either a first power level or a second power level. Because the MSB has two possible values, the second modulated signal can have either a third power level or a fourth power level. Because there are four possible combinations of the LSB and the MSB ($2^2$), the optical signal combiner 118 generates a PAM4 signal by combining the first modulated signal and the second modulated signal to generate a combined modulated signal. Thus, the PAM4 signal converges to one of four power level values corresponding to the combination of the LSB and MSB.

Figure 7:
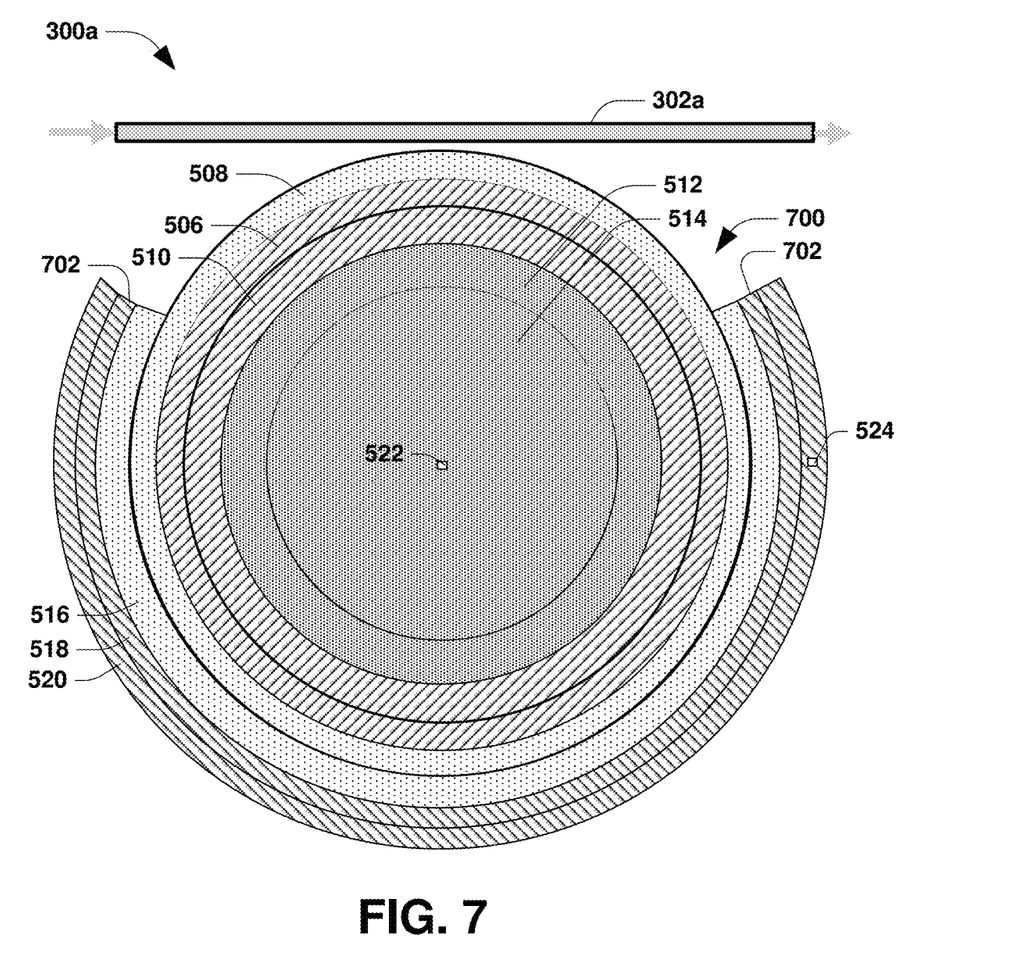
FIG. 7 is an illustration of a ring modulator, according to some embodiments.

FIG. 7 is an illustration of an embodiment of the first ring modulator 300a. The first ring modulator 300a comprises concentric circular and semi-circular semiconductor regions 700. The circular semiconductor regions include the first contact region 514, the third buried region 512, the first buried region 510, the first ring region 506, and the second ring region 508. The semi-circular semiconductor regions include the second buried region 516, the fourth buried region 518, and the second contact region 520. The semi-circular semiconductor regions terminate at termination regions 702 so as to not intersect or underlap the first waveguide bus 302a. Other configurations of the first ring modulator 300a are within the scope of the present disclosure.

Figure 8:
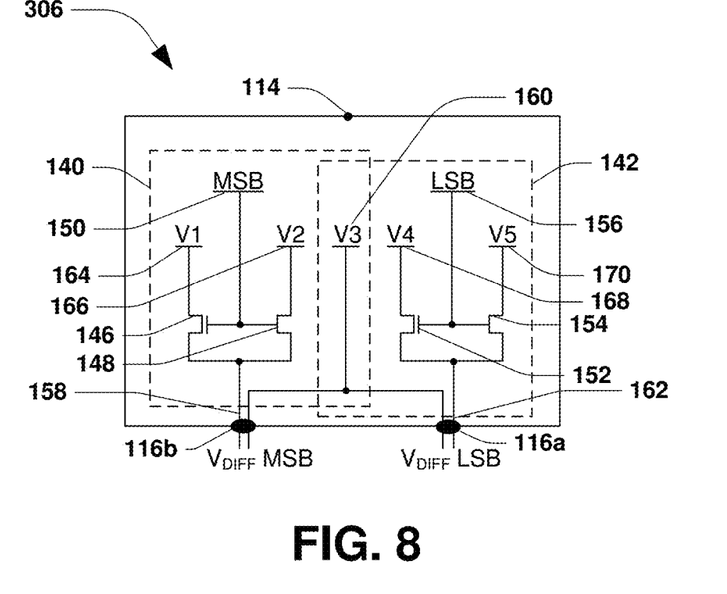
FIG. 8 is a schematic diagram of a differential signal generator, according to some embodiments.

FIG. 8 is a schematic diagram of a differential signal generator 306, according to some embodiments. The differential signal generator 306 comprises the data input terminal 114 for receiving bit values, including the MSB and the LSB. The MSB is converted to a differential signal $V_{DIFF}$ MSB by a first converter 140. The first converter 140 comprises a first switch 146 and a second switch 148. According to some embodiments, one of the first switch 146 or the second switch 148 is an n-channel MOSFET (NMOS) and the other of the first switch 146 or the second switch 148 is a p-channel MOSFET (PMOS). The gates of the NMOS and PMOS transistors of the first converter 140 are coupled to a first terminal 150 configured to receive the MSB. The first converter 140 comprises a voltage source terminal V3 160. The voltage source terminal V3 160 and the source terminals of the NMOS and PMOS transistors of the first converter 140 are coupled to a first differential signal conductor 158 coupled to the second output terminal 116b and comprise the terminals of the differential signal $V_{DIFF}$ MSB.

The LSB is converted to a differential signal $V_{DIFF}$ LSB by a second converter 142. The second converter 142 comprises a third switch 152 and a fourth switch 154. According to some embodiments, one of the third switch 152 or the fourth switch 154 is an n-channel MOSFET (NMOS) and the other of the third switch 152 or the fourth switch 154 is a p-channel MOSFET (PMOS). The gates of the NMOS and PMOS transistors of the second converter 142 are coupled to a second terminal 156 configured to receive the LSB. The second converter 142 comprises the voltage source terminal V3 160. The voltage source terminal V3 160 and the source terminals of the NMOS and PMOS transistors of the second converter 142 are coupled to a second differential signal conductor 162 coupled to the first output terminal 116a and comprise the terminals of the differential signal $V_{DIFF}$ LSB.

According to some embodiments, the voltage source terminal V3 160 is electrically coupled to the n+ doped regions of the first ring modulator 300a and the second ring modulator 300b, and V3=3V. The first differential signal conductor 158 is electrically coupled to the p+ doped region of the second ring modulator 300b, V1=0V, and V2=1V. The second differential signal conductor 162 is electrically coupled to the p+ doped region of the first ring modulator 300a, V4=2V, and V5=0V. The voltages V1-V5 are provided as examples and not by way of limitation. The example voltages make certain that the combined modulated signal is a PAM4 signal. Other configurations and voltages of the differential signal generator 306 are within the scope of the present disclosure.

Figure 9:
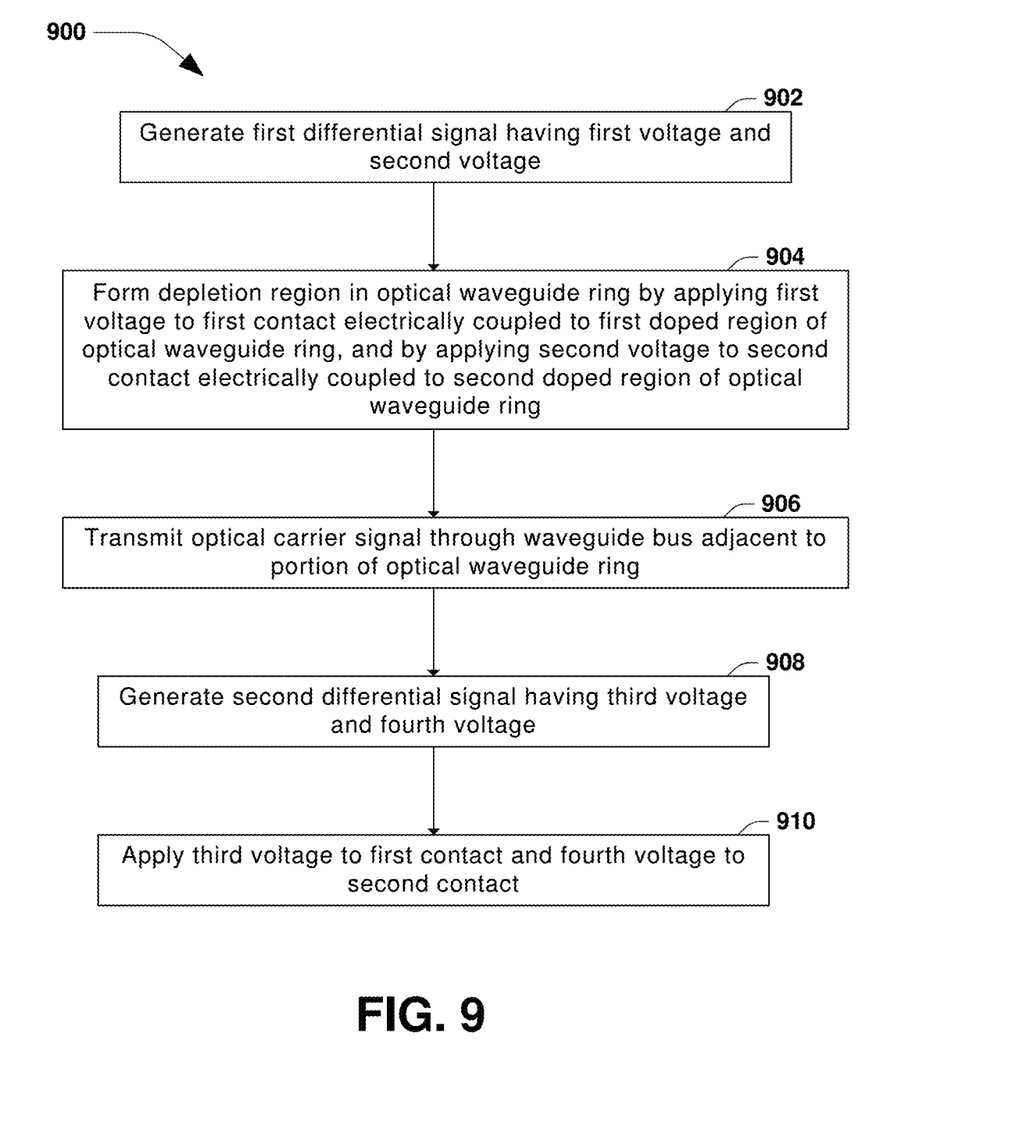
FIG. 9 illustrates a method for modulating an optical carrier signal, according to some embodiments.

FIG. 9 illustrates a method 900 for modulating an optical carrier signal, according to some embodiments. The method 900 comprises generating a first differential signal having a first voltage and a second voltage 902, forming a depletion region in an optical waveguide ring by applying the first voltage to a first contact electrically coupled to a first doped region of the optical waveguide ring, and by applying the second voltage to a second contact electrically coupled to a second doped region of the optical waveguide ring 904, transmitting an optical carrier signal through a waveguide bus adjacent to a portion of the optical waveguide ring 906, generating a second differential signal having a third voltage and a fourth voltage 908, and applying the third voltage to the first contact and the fourth voltage to the second contact 910. Other and/or alternative acts of the method 900 are within the scope of the present disclosure.

An optical signal modulator 100 comprises a symmetrical directional coupler 144 that splits an optical waveform into two carrier signals. Because the directional coupler 144 is symmetrical, the two carrier signals are consequently 90° out of phase. The directional coupler 144 also splits the power of the optical waveform such that one of the carrier signals has a power level that is different than the power level of the other carrier signal. A first carrier signal of the carrier signals is modulated by a first ring modulator 300a in accordance with the value of a LSB and a second carrier signal of the carrier signals is modulated by a second ring modulator 300b in accordance with the value of a MSB. The two modulated carrier signals are combined by an optical signal combiner 118 to form a PAM4 signal.

The optical signal modulator 100 is advantageously compact. Due to the symmetrical configuration of the optical signal modulator 100, the 90° phase shift and power split of the two carrier signals are readily achievable and maintained through the first ring modulator and the second ring modulator. The data rate of the optical signal modulator 100 is double the baud rate of the two carrier signals. For example, if the baud rate of each carrier signal is 50 Gigabits/second, the data rate of the optical signal modulator is 100 Gigabits/second. Moreover, the optical signal modulator 100 is compatible through a wide range of frequency bands, including the C-band and the O-band.

According to some embodiments, an optical signal modulator for modulating an optical carrier signal includes a directional coupler having an input terminal for receiving light, a first output terminal, and a second output terminal, wherein the directional coupler is configured to receive light and split the light into a first part for outputting at the first output terminal and a second part for outputting at the second output terminal, a first ring modulator optically coupled to the first output terminal and configured to control an amount of the first part of the light passing therethrough based upon a first differential signal applied to the first ring modulator to generate a first output, a second ring modulator optically coupled to the second output terminal and configured to control an amount of the second part of the light passing therethrough based upon a second differential signal applied to the second ring modulator to generate a second output, and an optical signal combiner optically coupled to the first ring modulator and to the second ring modulator and configured to combine the first output and the second output to generate a combined output.

According to some embodiments, the optical signal modulator includes a differential signal generator having a first output terminal electrically coupled to the first ring modulator and configured to provide the first differential signal to the first ring modulator, and a second output terminal electrically coupled to the second ring modulator and configured to provide the second differential signal to the second ring modulator.

According to some embodiments the differential signal generator includes a data input terminal configured to receive a first bit signal and a second bit signal, a first converter configured to receive the first bit signal, generate the first differential signal based on the first bit signal, and output the first differential signal, and a second converter configured to receive the second bit signal, generate the second differential signal based on the second bit signal, and output the second differential signal, wherein the first converter is electrically coupled to the first ring modulator, and the second converter is electrically coupled to the second ring modulator.

According to some embodiments, the directional coupler includes a first waveguide optically coupled to the input terminal and to the first ring modulator, and a second waveguide optically coupled to the second ring modulator.

According to some embodiments, the optical signal modulator includes an absorption terminator optically coupled to the second waveguide.

According to some embodiments, the first waveguide includes a first optical coupling surface, the second waveguide includes a second optical coupling surface, the first optical coupling surface and the second optical coupling surface define an optical coupling region having an optical coupling length and an optical coupling width, and a difference in a power level of the first part of the light output at the first output terminal and a power level of the second part of the light output at the second output terminal is based on at least one of the optical coupling length or the optical coupling width.

According to some embodiments, the first ring modulator includes a waveguide bus optically coupled to the first output terminal and a waveguide ring optically coupled to the waveguide bus.

According to some embodiments, the waveguide ring includes a first ring region and a second ring region.

According to some embodiments, the first ring region and the second ring region include a depletion region within the waveguide ring.

According to some embodiments, the optical signal modulator includes a differential signal generator electrically coupled to the first ring region and the second ring region, and a substrate comprising a first contact region and a second contact region, wherein the first contact region of the substrate is coupled to the first ring region, and the second contact region of the substrate is coupled to the second ring region.

According to some embodiments, a device for modulating an optical carrier signal includes a directional coupler, a differential signal generator, and a ring modulator optically coupled to the directional coupler and electrically coupled to the differential signal generator. According to some embodiments the ring modulator includes a substrate, a first contact region electrically coupled to the differential signal generator, and a second contact region electrically coupled to the differential signal generator.

According to some embodiments the substrate includes a first ring region coupled to the first contact region, and a doping concentration of the first contact region is greater than a doping concentration of the first ring region.

According to some embodiments, the substrate includes a second ring region coupled to the second contact region, and a doping concentration of the second ring region is less than a doping concentration of the second contact region.

According to some embodiments, the first ring region and the second ring region include a modulation region of the ring modulator.

According to some embodiments, the first contact region and the second contact region are each coupled to a waveguide ring.

According to some embodiments, the ring modulator includes a waveguide optically coupled to the waveguide ring.

According to some embodiments, a method for modulating an optical carrier signal includes generating a first differential signal having a first voltage and a second voltage, forming a depletion region in an optical waveguide ring by applying the first voltage to a first contact electrically coupled to a first doped region of the optical waveguide ring, applying the second voltage to a second contact electrically coupled to a second doped region of the optical waveguide ring, and transmitting the optical carrier signal to the optical waveguide ring.

According to some embodiments, the depletion region is modified by applying a third voltage to the first contact and applying a fourth voltage to the second contact.

According to some embodiments, a first voltage difference between the third voltage and the first voltage is different than a second difference between the fourth voltage and the second voltage.

According to some embodiments, the method for modulating an optical carrier signal includes dissipating at least a portion of the optical carrier signal in the depletion region, wherein a percentage of the portion that is dissipated is based on a voltage difference between the first voltage and the second voltage.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally to be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An optical signal modulator for modulating an optical carrier signal, comprising:
    a directional coupler comprising an input terminal for receiving light, a first output terminal, and a second output terminal, wherein:
        the directional coupler is configured to receive light and split the light into a first part for outputting at the first output terminal and a second part for outputting at the second output terminal,
        the directional coupler comprises a first waveguide physically connected between the input terminal and the first output terminal, and
        the first waveguide comprises a first curved portion, a second curved portion, and a linear portion between the first curved portion and the second curved portion;
    a first ring modulator optically coupled to the first output terminal and configured to control an amount of the first part of the light passing therethrough based upon a first differential signal applied to the first ring modulator to generate a first output;
    a second ring modulator optically coupled to the second output terminal and configured to control an amount of the second part of the light passing therethrough based upon a second differential signal applied to the second ring modulator to generate a second output; and
    an optical signal combiner optically coupled to the first ring modulator and to the second ring modulator and configured to combine the first output and the second output to generate a combined output.

2. The optical signal modulator of claim 1, comprising:
a differential signal generator comprising:
   a first output terminal electrically coupled to the first ring modulator and configured to provide the first differential signal to the first ring modulator; and
   a second output terminal electrically coupled to the second ring modulator and configured to provide the second differential signal to the second ring modulator.

3. The optical signal modulator of claim 2, wherein:
the differential signal generator comprises:
   a data input terminal configured to receive a first bit signal and a second bit signal;
   a first converter configured to receive the first bit signal, generate the first differential signal based on the first bit signal, and output the first differential signal; and
   a second converter configured to receive the second bit signal, generate the second differential signal based on the second bit signal, and output the second differential signal,
the first converter is electrically coupled to the first ring modulator, and
the second converter is electrically coupled to the second ring modulator.

4. The optical signal modulator of claim 1, wherein:
the first waveguide is optically coupled to the first ring modulator, and
the directional coupler comprises a second waveguide optically coupled to the second ring modulator.

5. The optical signal modulator of claim 4, comprising an absorption terminator optically coupled to the second waveguide.

6. The optical signal modulator of claim 4, wherein:
the linear portion is a first optical coupling surface,
the second waveguide comprises a second optical coupling surface disposed between a third curved portion and a fourth curved portion of the second waveguide,
the first optical coupling surface and the second optical coupling surface define an optical coupling region having an optical coupling length and an optical coupling width, and
a difference in a power level of the first part of the light output at the first output terminal and a power level of the second part of the light output at the second output terminal is based on at least one of the optical coupling length or the optical coupling width.

7. The optical signal modulator of claim 1, wherein the first ring modulator comprises:
   a waveguide bus optically coupled to the first output terminal; and
   a waveguide ring optically coupled to the waveguide bus.

8. The optical signal modulator of claim 7, wherein the waveguide ring comprises a first ring region and a second ring region.

9. The optical signal modulator of claim 8, wherein the first ring region and the second ring region comprise a depletion region within the waveguide ring.

10. The optical signal modulator of claim 8, comprising:
   a differential signal generator electrically coupled to the first ring region and the second ring region; and
   a substrate comprising a first contact region and a second contact region, wherein:
      the first contact region of the substrate is coupled to the first ring region, and
      the second contact region of the substrate is coupled to the second ring region.

11. The optical signal modulator of claim 10, wherein a doping concentration of the first contact region is greater than a doping concentration of the first ring region.

12. The optical signal modulator of claim 11, wherein a doping concentration of the second ring region is less than a doping concentration of the second contact region.

13. The optical signal modulator of claim 12, wherein the first ring region and the second ring region comprise a modulation region of the first ring modulator.

14. The optical signal modulator of claim 10, wherein the first contact region and the second contact region are each coupled to the waveguide ring.

15. An optical signal modulator for modulating an optical carrier signal, comprising:
   a first ring modulator configured to control an amount of light passing therethrough based upon a first differential signal generated by a differential signal generator and applied to the first ring modulator to generate a first output, wherein the first ring modulator comprises:
      a first contact region;
      a first buried region having a first doping concentration;
      a second buried region having a second doping concentration less than the first doping concentration, where the first buried region is between the first contact region and the second buried region; and
      a first ring region, wherein the second buried region is between the first buried region and the second buried region;
   a second ring modulator configured to control an amount of the light passing therethrough based upon a second differential signal generated by the differential signal generator and applied to the second ring modulator to generate a second output; and
   an optical signal combiner optically coupled to the first ring modulator and to the second ring modulator and configured to combine the first output and the second output to generate a combined output.

16. The optical signal modulator of claim 15, wherein:
the first ring modulator comprises:
   a substrate; and
   a second contact region electrically coupled to the differential signal generator,
the first contact region is electrically coupled to the differential signal generator, and
the first buried region and the second buried region underlie the substrate.

17. The optical signal modulator of claim 16, wherein:
the first ring region is coupled to the first contact region through the first buried region and the second buried region, and
a doping concentration of the first contact region is greater than a doping concentration of the first ring region.

18. The optical signal modulator of claim 17, wherein:
the substrate comprises a second ring region coupled to the second contact region, and
a doping concentration of the second ring region is less than a doping concentration of the second contact region.

19. An optical signal modulator for modulating an optical carrier signal, comprising:
   a directional coupler comprising:
      a first waveguide; and
      a second waveguide optically coupled to the first waveguide;
   a first ring modulator configured to control an amount of light passing therethrough from the first waveguide based upon a first differential signal applied to the first ring modulator to generate a first output;

a second ring modulator configured to control an amount of the light passing therethrough from the second waveguide based upon a second differential signal and applied to the second ring modulator to generate a second output; and an optical signal combiner optically coupled to the first ring modulator and to the second ring modulator and configured to combine the first output and the second output to generate a combined output, wherein no heater surrounds any portion of either of the first ring modulator or the second ring modulator.

* * * * *